(12) United States Patent
Russo et al.

(10) Patent No.: US 12,311,967 B2
(45) Date of Patent: *May 27, 2025

(54) VEHICLE CONTROL METHOD WITH ROAD SIGN RECOGNITION

(71) Applicant: FERRARI S.P.A., Modena (IT)

(72) Inventors: Giovanni Russo, Modena (IT); Andrea Secondi, Modena (IT)

(73) Assignee: FERRARI S.P.A., Modena (IT)

(*) Notice: Subject to any disclaimer, the term of this patent is extended or adjusted under 35 U.S.C. 154(b) by 56 days.

This patent is subject to a terminal disclaimer.

(21) Appl. No.: 18/180,568

(22) Filed: Mar. 8, 2023

(65) Prior Publication Data

US 2023/0294725 A1 Sep. 21, 2023

(30) Foreign Application Priority Data

Mar. 15, 2022 (IT) .................. 102022000004946

(51) Int. Cl.
*B60W 50/14* (2020.01)
*B60W 40/06* (2012.01)
*G06V 20/56* (2022.01)
*G06V 20/58* (2022.01)

(52) U.S. Cl.
CPC ............ *B60W 50/14* (2013.01); *B60W 40/06* (2013.01); *G06V 20/582* (2022.01); *G06V 20/588* (2022.01); *B60W 2050/146* (2013.01); *B60W 2552/05* (2020.02); *B60W 2555/60* (2020.02)

(58) Field of Classification Search
CPC ................. B60W 50/14; B60W 40/06; B60W 2050/146; B60W 2552/05; B60W 2555/60; G06V 20/582; G06V 20/588; G01C 21/3697; G01C 21/3602; G08G 1/09623
See application file for complete search history.

(56) References Cited

U.S. PATENT DOCUMENTS

| 2005/0232469 | A1* | 10/2005 | Schofield ................... B60R 1/12 382/104 |
| 2010/0246889 | A1* | 9/2010 | Nara ..................... G06V 20/588 382/104 |
| 2013/0027511 | A1* | 1/2013 | Takemura ............ G06V 20/588 348/42 |
| 2013/0049988 | A1 | 2/2013 | Roeber et al. |
| 2013/0101174 | A1 | 4/2013 | Meis et al. |

(Continued)

FOREIGN PATENT DOCUMENTS

CN 110070742 A 7/2019

OTHER PUBLICATIONS

Extended European Search Report of European Patent App. No. 23161734.1, Mailing date: Jul. 28, 2023, 9 pages.

(Continued)

*Primary Examiner* — Ryan W Sherwin
(74) *Attorney, Agent, or Firm* — CANTOR COLBURN LLP (57) ABSTRACT

A control method to control a vehicle driving along a main road having a plurality of detours only arranged on one side of the main road. The control method exhibits the steps of: recognising a road surface marking present on a surface of the main road; recognising a road sign present beside the main road in order to determine possible speed limits set by the road sign; and establishing whether a speed limit set by a road sign refers to a detour or to the main road.

18 Claims, 10 Drawing Sheets

(56) References Cited

U.S. PATENT DOCUMENTS

| | | | |
|---|---|---|---|
| 2015/0302747 A1 | 10/2015 | Ro | |
| 2016/0275792 A1* | 9/2016 | Takiguchi | G06V 20/582 |
| 2016/0347323 A1* | 12/2016 | Yoshitomi | B60W 40/06 |
| 2018/0180435 A1* | 6/2018 | Schneider | G05D 1/0278 |
| 2018/0239971 A1* | 8/2018 | Kim | G06V 20/58 |
| 2018/0244277 A1 | 8/2018 | Yoshitomi et al. | |
| 2019/0325237 A1* | 10/2019 | Zhang | G06V 20/588 |
| 2020/0234587 A1 | 7/2020 | Girond | |
| 2021/0364319 A1* | 11/2021 | Abramson | G01C 21/3815 |
| 2023/0150526 A1* | 5/2023 | Nessler | B60W 30/146 |
| | | | 340/435 |
| 2023/0322222 A1* | 10/2023 | Russo | G01C 21/3602 |
| | | | 701/26 |

OTHER PUBLICATIONS

Italian Search Report for Application No. 102022000004946; Filing Date: Mar. 15, 2022; Date of Mailing—Oct. 21, 2022, 9 pages.

* cited by examiner

VEHICLE CONTROL METHOD WITH ROAD SIGN RECOGNITION

CROSS-REFERENCE TO RELATED APPLICATIONS

This patent application claims priority from Italian patent application no. 102022000004946 filed on Mar. 15, 2022, the entire disclosure of which is incorporated herein by reference.

TECHNICAL FIELD

The present invention relates to a vehicle control method.

PRIOR ART

The many ADAS types (acronym for "Advanced Driver Assistance Systems") that are present in modern cars also include the Automatic Traffic Sign Recognition that recognizes traffic signs ahead of the vehicle and, if deemed necessary, informs the driver of the obligations set by these traffic signs. That is, the automatic traffic t sign recognition assists the driver by continuously displaying, for example, the speed limits and no entry and no overtaking bans recognized along the route and their ending, and an audible and visual warning alerts the driver of a traffic sign violation.

A camera positioned on the inside of the windscreen (usually arranged next to the rear-view mirror) can recognize roadside traffic signs, overhead signs, or construction site signs. Traffic signs detected by the camera are compared in fractions of a second with those stored in the system. After further comparison with the navigation information, the currently valid traffic signs are displayed on the instrument pack (on the cockpit or head-up display).

Along a main road (which may be a major road such as a motorway or expressway or any single or multiple carriageway road) there are a number of detours and these detours must be travelled at a maximum speed which is significantly lower than the maximum speed permitted on the main road; for example, the speed limit on an Italian motorway is generally 130 km/h, whereas the speed limit on motorway detours (exits) is generally 50-80 km/h. Accordingly, road signs are arranged near a detour from a main road, on the same side of the carriageway as the detour, which indicate the speed limit only applying to the detour (and therefore not to the main road).

The automatic traffic sign recognition could incorrectly warn the driver of speed limits only applying to the detour (and therefore not to the main road) even when the driver is not actually going to take the detour but is going to continue along the main road, and this incorrect signalling becomes very annoying in the long run (especially in the case of non-toll expressways where exit junctions are relatively frequent).

The most recent GSR ("General Safety Regulation") provides for preventing or in any case minimizing the error rate in the signalling of speed limits under real driving conditions and also provides for the signalling of a new speed limit within a relatively short time (a few seconds) from the encounter of the corresponding sign indicating the new speed limit. It is therefore necessary for the automatic traffic sign recognition to be able to correctly assign the speed limits indicated by the road signs to the relevant roads and, in the case of several alternatives, also to be able to quickly determine which road the vehicle driver intends to continue on.

Patent applications US2015302747A1, US2013101174A1, US2013049988A1, US2018244277A1, and CN110070742A describe vehicle control methods which provide for informing the driver of the speed limits set by the road signs, distinguishing between the speed limits relating to a main road and the speed limits relating to a detour branching off from the main road.

DESCRIPTION OF THE INVENTION

The object of the present invention is to provide a vehicle control method which allows the above-described drawback to be prevented, i.e., prevents the driver from being warned of speed limits applying to a detour when the driver is going to continue along the main road and, similarly, prevents the driver from being warned of speed limits applying to the main road when the driver is going to take the detour.

According to the present invention there is provided a vehicle control method as claimed in the appended claims.

The claims describe preferred embodiments of the present invention forming an integral part of the present specification.

BRIEF DESCRIPTION OF THE DRAWINGS

The present invention will now be described with reference to the attached drawings, which illustrate a non-limiting embodiment thereof.

PREFERRED EMBODIMENTS OF THE INVENTION

Figure 1:
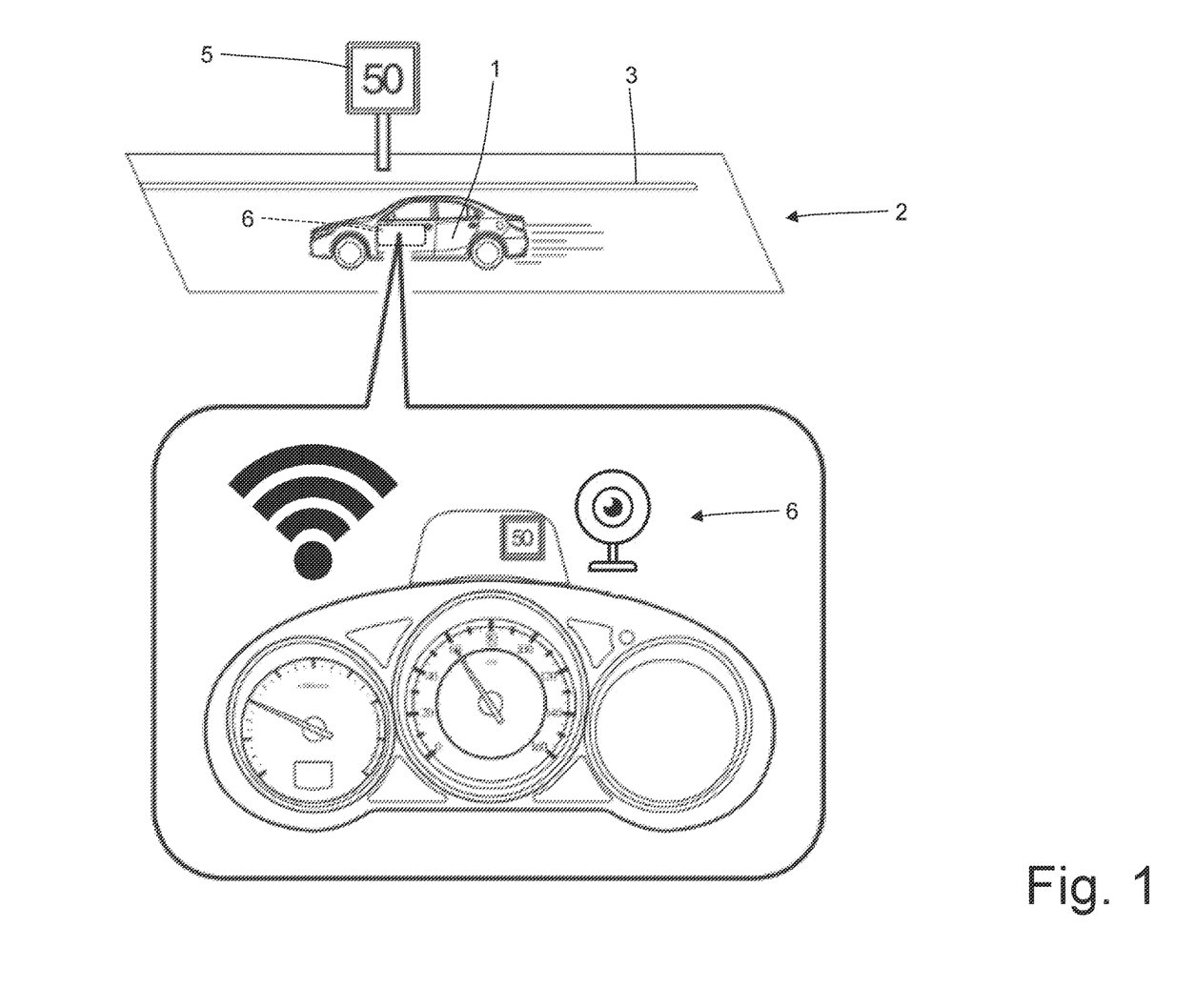
FIG. 1 is a schematic view of a vehicle implementing the control method of the present invention.

In FIG. 1, number 1 indicates, as a whole, a road vehicle (in particular a car) travelling along a main road 2.

The main road 2 is provided with a road surface marking that is present on a surface of the main road 2 and comprises external (always continuous) lines 3 bordering the roadsides and optionally internal lines 4 (which are illustrated in FIGS. 2-10 and can be continuous or broken) bordering the lanes; that is, the road surface marking consists of all the stripes and writings that can be encountered on the road surface as a prescription or indication for the purpose of regulating the circulation of vehicles and people.

The main road 2 is also provided with traffic signs, i.e., road signs 5, which set limits and prohibitions and set, i.e., speed limits; that is, traffic signs are the set of signs 5 bordering the main road 2 and are placed vertically.

The vehicle 1 comprises an automatic traffic sign recognition system 6 that recognizes road signs 5 ahead of the vehicle 1 and, if deemed necessary, informs the driver of the obligations set by these road signs 5. That is, the automatic traffic sign recognition system 6 assists the driver by continuously displaying, for example, speed limits, work in progress, slippery road hazards or the no overtaking ban recognized along the route and their ending, and optional audible and visual warning alerts the driver in the event that the indications on the road signs 5 are not observed (generally the audible warning is only generated when the speed limit is exceeded).

A camera positioned on the inside of the windscreen (usually arranged next to the rear-view mirror) can recognize the road signs 5 on the side of the carriageway. The road signs 5 detected by the camera are compared with those stored in the system. After further comparison with the information of a satellite positioning system equipped with georeferenced mapping (i.e., equipped with maps showing all the roads), the currently valid road signs 5 are displayed on the instrument pack (on the cockpit or head-up display).

According to the exemplary embodiment shown in FIGS. 2-10, the main road 2 has a plurality of detours 7 (e.g., exit junctions, only one of which is shown in FIGS. 2-10) arranged on one side of the main road 2; if the main road 2 is a right-hand drive road (as shown in the attached figures), the detours 7 are generally on the right-hand side, whereas if the main road 2 is left-hand drive road, the detours 7 are generally on the left-hand side. According to other embodiments, not shown, the main road 2 has a plurality of detours 7 on either side of the main road 2.

The control method implemented in the automatic traffic sign recognition system 6 recognizes the road surface marking (i.e., the external lines 3 and the internal lines 4) on the surface of the main road 2, recognizes the road signs 5 located beside the main road 2 in order to determine possible speed limits set by the road signs and, using this information, warns the driver of the vehicle 1 of the speed limits set by the road signs.

In addition, the control method implemented in the automatic traffic sign recognition system 6 establishes whether a speed limit set by a road sign 5, for example near the vehicle 1 (that is, ahead of the vehicle and only a few metres from the vehicle) refers to the main road 2 or refers to a detour 7 located ahead of the vehicle 1. That is, the control method implemented in the automatic traffic sign recognition system 6 determines whether the vehicle 1 is close to a detour 7 located ahead of the vehicle 1 and establishes whether a speed limit set by the road sign next to the detour 7 refers to the detour 7 (i.e., establishes a speed limit applying to the detour 7 or establishes a speed limit applying to the main road 2).

Figure 2:
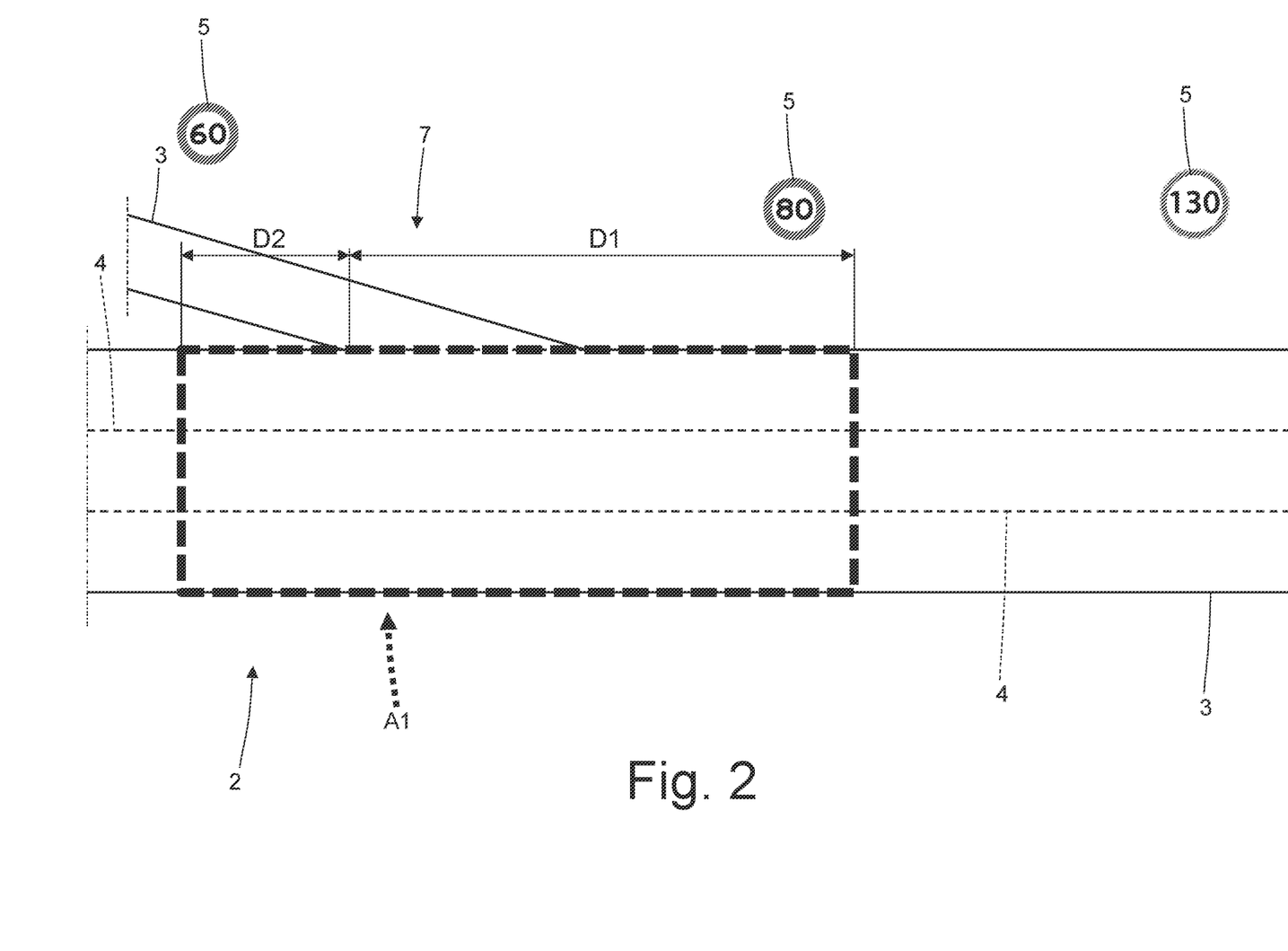
FIGS. 2 and 3 are two schematic views of a main road having a detour, which show a pertaining area and a manoeuvring area, respectively.

In particular, when the control method implemented in the automatic traffic sign recognition system 6 detects the presence of a sign 5 indicating a speed limit, it checks, through the information provided by the satellite positioning system equipped with georeferenced mapping, whether there is a detour 7 ahead of the vehicle 1 and therefore whether the sign 5 is located in an area A1 pertaining to the detour 7 (shown in FIG. 2).

According to a preferred embodiment, the area A1 pertaining to a detour 7 begins at a predetermined distance D1 before the detour 7 and ends at a predetermined distance D2 after the detour 7; i.e., the area A1 pertaining to the detour 7 includes the detour 7. Generally, the predetermined distance D1 is (much) greater than the distance D2. By way of example, the predetermined distance D1 ranges from 80 to 140 metres (with a typical value of about 100 metres) and the predetermined distance D2 ranges from 20 to 40 metres; more generally, the predetermined distance D1 ranges from 50 to 250 metres.

The area A1 pertaining to the detour 7 is determined solely on the basis of information provided by the satellite positioning system equipped with georeferenced mapping, begins upstream of the detour 7 at the predetermined distance D1 from the detour 7 and ends downstream of the detour 7 at the predetermined distance D2 from the detour 7, which is smaller than the predetermined distance D1. In other words, the area A1 pertaining to the detour 7 is a space containing the detour 7 and is asymmetrically centred on the detour 7 (as the predetermined distance D2 is smaller than the predetermined distance D1).

The area A1 pertaining to the detour 7 extends beyond the detour 7 essentially because a sign 5 referring to the detour 7 can be arranged at the detour 7 or even slightly beyond the detour 7; furthermore, the area A1 pertaining to the detour 7 extends beyond the detour 7 also to take into account inevitable errors both in determining the exact position of a sign 5 and in maps stored in the georeferenced mapping.

Therefore, a road sign 5 is within (inside) the area A1 pertaining to the detour 7 if it is upstream of the detour 7 and not beyond the predetermined distance D1 from the detour 7 or if it is downstream of the detour 7 and not beyond the predetermined distance D2 from the detour 7. As mentioned above, the distance of a road sign 5 from the detour 7 is determined by using the information provided by the satellite positioning device equipped with georeferenced mapping.

The road sign 5 is usually present in the georeferenced mapping and therefore its distance from the detour 7 is determined solely on the basis of the information provided by the georeferenced mapping stored in the satellite positioning device; alternatively, the control method implemented in the automatic traffic sign recognition system 6 could determine the distance of a road sign 5 from a detour 7 that is located ahead of the vehicle 1 by determining (through the satellite positioning device equipped with georeferenced mapping) the distance between the vehicle 1, when the vehicle 1 is at the sign 5 (i.e., practically next to the sign 5), and the detour 7 that is located ahead of the vehicle 1.

The distance of a road sign 5 from a detour 7 that is located ahead of the vehicle 1 is compared with the predetermined distance D1 or the predetermined distance D2 to establish whether the road sign 5 is inside or outside the area A1 pertaining to the detour and therefore whether the sign 5 refers to the main road 2 (when the sign 5 is outside the area A1 pertaining to the detour 7) or whether the road sign 5 could refer to the detour 7 (when the sign 5 is inside the area A1 pertaining to the detour 7).

The automatic traffic sign recognition system 6, in addition to checking whether the sign 5 is located within the area A1 pertaining to the detour 7, also checks whether the speed limit set by the sign 5 is lower than a speed limit currently signalled to the driver of the vehicle 1 (i.e., is lower than a speed limit assigned to the main road 2 and set by a previous road sign 5 or provided by the satellite positioning system equipped with georeferenced mapping).

The control method implemented in the automatic traffic sign recognition system 6 establishes that the speed limit set by the road sign 5 refers to the main road 2 if the sign 5 is outside the area A1 pertaining to the detour 7 or if the speed limit set by the sign 5 is higher than or equal to the speed limit currently signalled to the driver of the vehicle 1 (it is sufficient for one of the two conditions to occur); accordingly, the control method implemented in the automatic traffic sign recognition system 6 establishes that the speed limit set by the road sign 5 refers to a detour 7 that is located ahead of the vehicle 1 only if the sign 5 is inside the area A1 pertaining to the detour 7 and, at the same time, only if the speed limit set by the sign 5 is lower than the speed limit currently signalled to the driver of the vehicle 1 (both conditions must be met).

According to a preferred embodiment, the satellite positioning system equipped with georeferenced mapping not only indicates the presence of a detour located ahead of the vehicle 1 and the distance of the detour from the vehicle 1, but also indicates the angular direction of the detour so that the automatic traffic sign recognition system 6 can know where to look for the detour 7 in the images captured by the camera.

In other words, the control method implemented in the automatic traffic sign recognition system 6 establishes whether a speed limit set by a road sign 5 refers to the main road 2 or to a detour 7 which is located ahead of the vehicle 1 and has been signalled by the satellite positioning system equipped with georeferenced mapping.

The control method implemented in the automatic traffic sign recognition system 6 establishes (as better explained below) whether the driver is going to take the detour 7 (or whether the driver is going to continue along the main road 2 instead), warns the driver of a speed limit set by a road sign 5 referring to the detour 7 (i.e., a sign 5 setting a speed limit applying to the detour 7) only when (i.e., only if) the driver is going to take the detour 7, and accordingly warns the driver of a speed limit set by a road sign 5 not referring to the detour 7 (hence referring to the main road 2) for as long as (i.e., only if) the driver does not intend to take the detour 7 (and thus continues along the main road 2).

As shown in FIG. 2, the right-most road sign 5 (bearing the limit "130") is located beyond the predetermined distance D1 from the detour 7 located ahead of the vehicle 1 (i.e., it is outside the area A1 pertaining to the detour 7) and accordingly, regardless of all other factors, is not assigned to the detour 7 located ahead of the vehicle 1 and is always assigned to the main road 2 (therefore it is signalled to the driver of the vehicle 1 for as long as the driver 1 does not intend to take the detour 7). In addition, as shown in FIG. 2, the right-most road sign 5 (bearing the limit "130") sets a speed limit that is not lower than the speed limit currently signalled to the driver of the vehicle 1 and therefore, regardless of all other factors, is not assigned to the detour 7 located ahead of the vehicle 1 and is always assigned to the main road 2 (therefore it is signalled to the driver of the vehicle 1 for as long as the driver 1 does not intend to take the detour 7).

As shown in FIG. 2, the road sign 5 arranged in the middle (bearing the limit "80") is within the predetermined distance D1 from the detour 7 located ahead of the vehicle 1 (i.e., it is inside the area A1 pertaining to the detour 7) and could therefore be assigned to the detour 7 if all other conditions were met (therefore, it would only be signalled to the driver of the vehicle 1 when the driver 1 is going to take the detour 7). Furthermore, as shown in FIG. 2, the road sign 5 arranged in the middle (bearing the limit "80") sets a speed limit that is lower than the speed limit currently signalled to the driver of the vehicle 1 and therefore could be assigned to the detour 7 if all other conditions were met (therefore, it would only be signalled to the driver of the vehicle 1 when the driver 1 is going to take the detour 7).

The control method implemented in the automatic traffic sign recognition system 6 establishes that the driver is going to take a detour 7 only if, when the vehicle 1 is within a manoeuvring area A2 of the detour 7 (shown in FIG. 3), the vehicle 1 operates a direction indicator towards the detour 7 or changes lanes towards the detour 7 and, at the same time, only if a line of the road surface marking delimiting the carriageway on the side of the vehicle 1 towards the detour 7 and ahead of the vehicle 1 is continuous.

Figure 3:
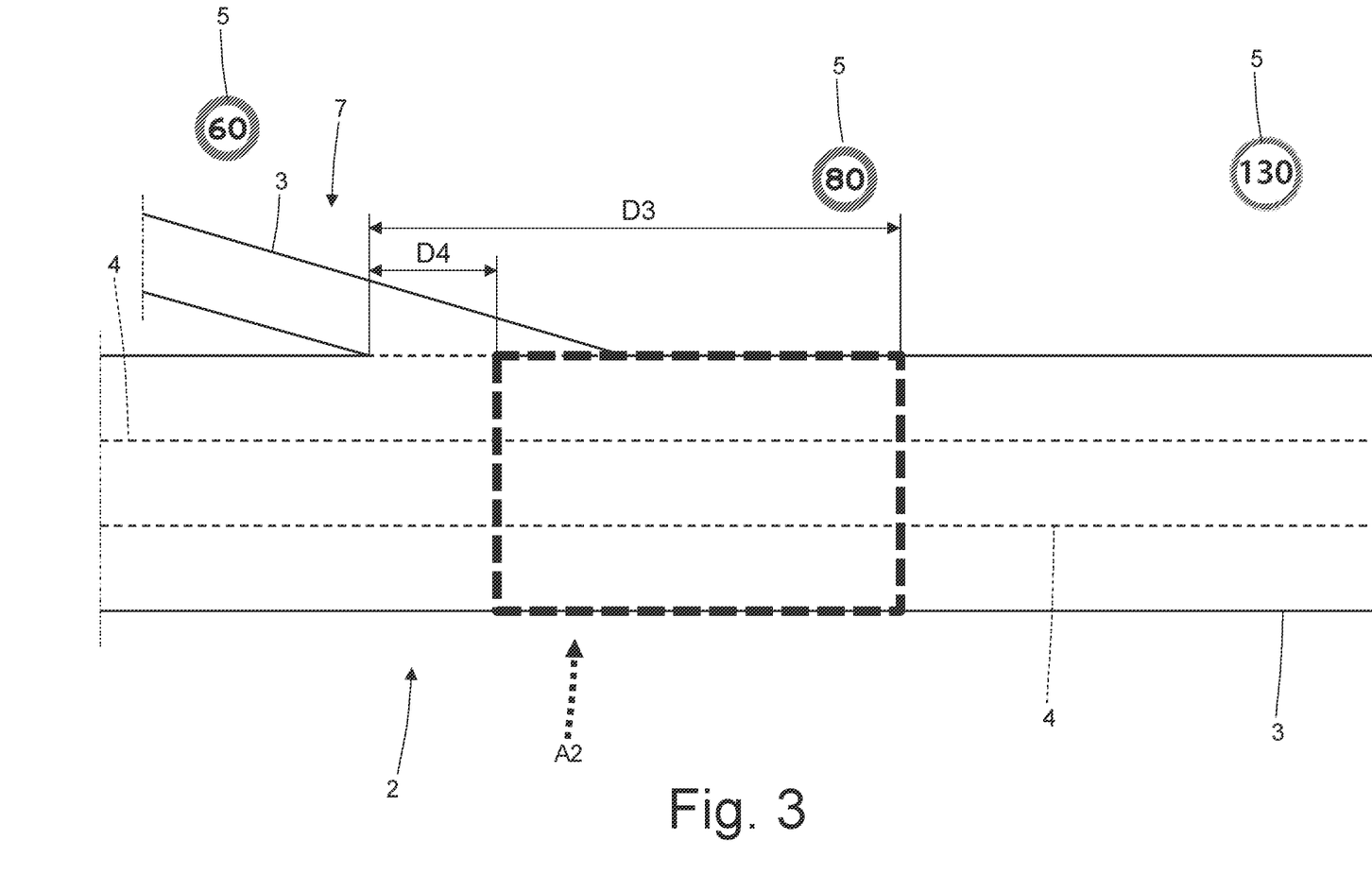

According to a preferred embodiment, the manoeuvring area A2 of a detour 7 begins at a predetermined distance D3 before the detour 7 and ends at a predetermined distance D4 before the detour 7; that is, the manoeuvring area A2 of the detour 7 is located upstream of the detour 7 and at a certain distance (equal to the predetermined distance D4) from the detour 7 and does not include the detour 7 (as opposed to the area A1 pertaining to the detour 7). Obviously, the predetermined distance D3 is (much) greater than the predetermined distance D4. By way of example, the predetermined distance D3 ranges from 80 to 140 metres (with a typical value of about 100 metres) and the predetermined distance D4 ranges from 10 to 30 metres; more generally, the predetermined distance D3 ranges from 50 to 250 metres. According to a preferred embodiment, the predetermined distance D3 (used to determine the beginning of the manoeuvring area A2 of the detour 7) is identical or substantially identical to the predetermined distance D1 (used to determine the beginning of the area A1 pertaining to the detour 7).

The manoeuvring area A2 of the detour 7 is determined solely on the basis of information provided by the satellite positioning system equipped with georeferenced mapping, begins upstream of the detour 7 at the predetermined distance D3 from the detour 7 and ends upstream of the detour 7 at the predetermined distance D4 from the detour 7, which is smaller than the predetermined distance D3. In other words, the manoeuvring area A2 of the detour 7 is a space that does not contain the detour 7 and is located upstream of the detour 7 (before the detour 7 in relation to the direction of travel).

The manoeuvring area A2 of the detour 7 ends a little before the detour 7 because the intention to take the detour 7 must be manifested a little before the detour 7 (i.e., a manoeuvre which suddenly and abruptly steers the vehicle 1 towards the detour 7 only when it is level with the detour 7 is contrary to the rules of the road and is therefore not envisaged).

The vehicle 1 is within (inside) the manoeuvring area A2 of the detour 7 if it is upstream of the detour 7 and at a distance from the detour 7 comprised between the predetermined distance D3 and the predetermined distance D4. As mentioned above, the distance of the vehicle 1 from the detour 7 is determined by using the information provided by the satellite positioning device equipped with georeferenced mapping.

Figure 4:
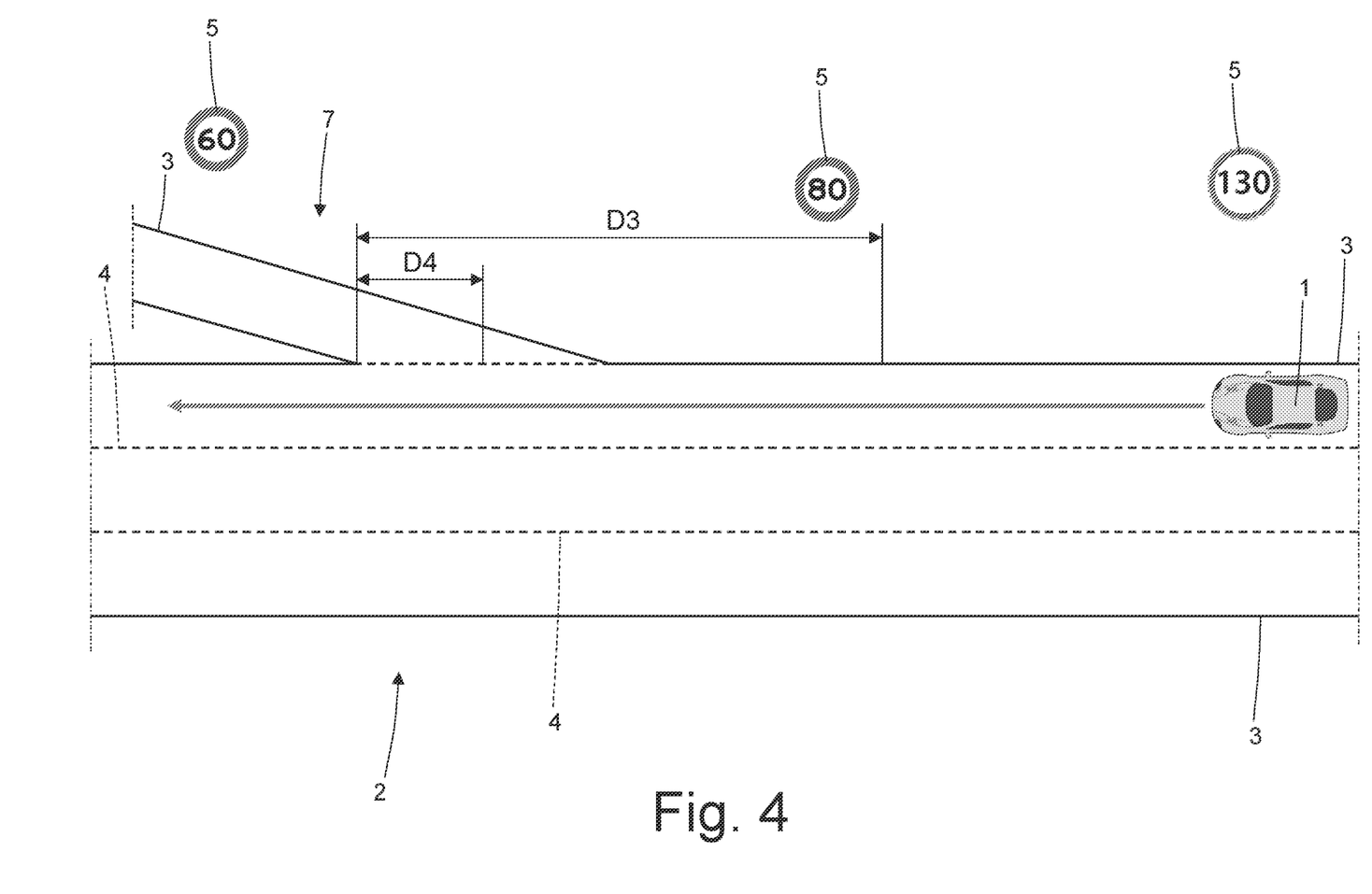
FIGS. 4-10 are schematic views of the main road in FIGS. 2 and 3, which show several road vehicles in different positions and with different driving intentions.

As shown in FIG. 4, the vehicle 1 in the far-right lane is at a distance from the detour 7 greater than the predetermined distance D3 and therefore is outside the manoeuvring area A2 (which begins at the predetermined distance D3 from the detour 7) and, whatever manoeuvre it may do, will never be identified as intending to take the detour 7 (obviously, as long as it remains at a distance greater than the predetermined distance D3 from the detour 7).

Figure 5:
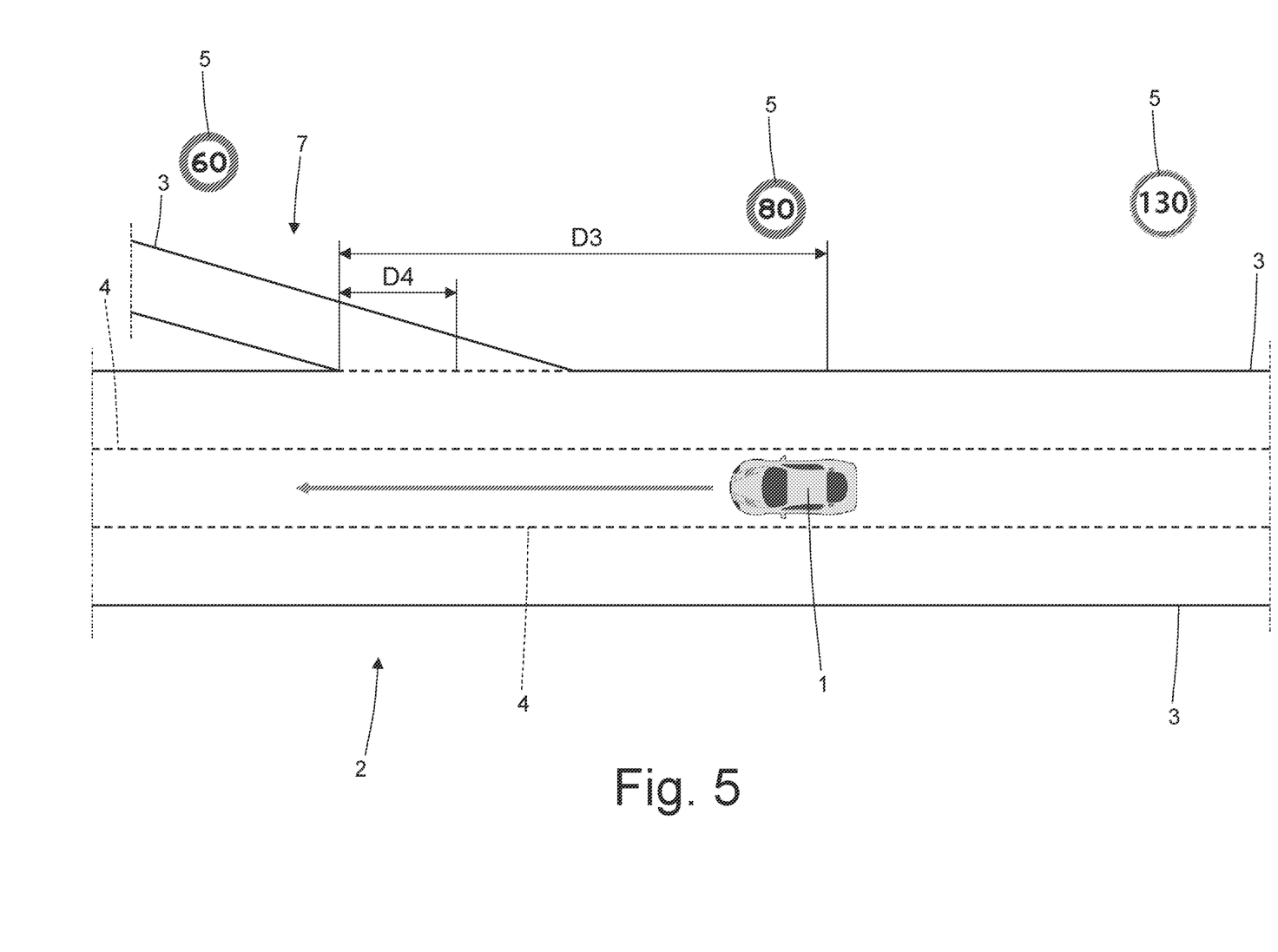

As shown in FIG. 5, the vehicle 1 in the middle lane is at a distance from the detour 7 smaller than the predetermined distance D3 and therefore is inside the manoeuvring area A2 (which begins at the predetermined distance D3 from the detour 7) and, depending on the manoeuvres it does, could be identified as intending to take the detour 7.

The control method implemented in the automatic traffic sign recognition system 6 establishes that the driver is going to take the detour 7 only if the detour 7 is not behind the vehicle 1, i.e., if the vehicle 1 has not already passed the detour 7; as explained above, this check is carried out by checking whether the vehicle 1 is inside the manoeuvring area A2 (and therefore the vehicle 1 has not yet passed the detour 7 as the manoeuvring area A2 ends a little before the detour 7) or whether the vehicle 1 is outside the manoeuvring area A2 (and therefore the vehicle 1 is still too far from the detour 7 or has already passed the detour 7). All the vehicles 1 shown in FIGS. 5-7 and 9-10 are located within the manoeuvring area A2 (consequently they have not already passed the detour 7) and therefore may potentially have the intention to take the detour 7, whereas the vehicle 1 shown in FIG. 4 and the vehicle 1 shown in FIG. 8 are outside the manoeuvring area A2 (in particular, the vehicle 1 shown in FIG. 8 has already passed the detour 7) and therefore it is entirely excluded that they may have the intention to take the detour 7 (i.e., in no case or way can the vehicle 1 shown in FIG. 4 or 8 be attributed the intention to take the detour 7).

The control method implemented in the automatic traffic sign recognition system 6 establishes that the driver is going to take the detour 7 only if the vehicle 1 changes lanes towards the detour 7 (or indicates the intention to change lanes towards the detour 7 by operating the corresponding direction indicator usually referred to as the "indicator"); that is, the driver is established to be going to take the detour 7 only if the vehicle 1 operates a direction indicator towards the detour 7 or changes lanes towards the detour 7.

The control method implemented in the automatic traffic sign recognition system 6 establishes that the driver is going to take the detour 7 only if the vehicle 1 operates a direction indicator towards the detour 7 or changes lanes towards the detour 7 and, at the same time, the road surface marking on the side of the vehicle 1 towards the detour 7 (i.e., the road surface marking delimiting the carriageway on the side of the vehicle 1 towards the detour 7) and ahead of the vehicle 1 is continuous and remains continuous. According to a preferred embodiment, the road surface marking delimiting the carriageway on the side of the vehicle 1 towards the detour 7 and ahead of the vehicle 1 must remain continuous over a predetermined distance D5 (shown in FIGS. 6, 7 and 10); i.e., the road surface marking delimiting the carriageway on the side of the vehicle 1 towards the detour 7 and ahead of the vehicle 1 must be continuous and remain (be) constantly continuous over the predetermined distance D5. By way of example, the predetermined distance D5 ranges from 15 to 35 metres (generally, the predetermined distance D5 is about 25 metres).

This way, the driver is established to be going to take the detour (7) only if the line of the road surface marking delimiting the carriageway on the side of the vehicle (1) towards the detour (7) and ahead of the vehicle (1) is continuous and constantly remains continuous until the detour 7 is passed (with some tolerance to take into account any errors); the passing of the detour 7 is determined by using the information provided by the satellite positioning system equipped with georeferenced mapping.

Figure 10:
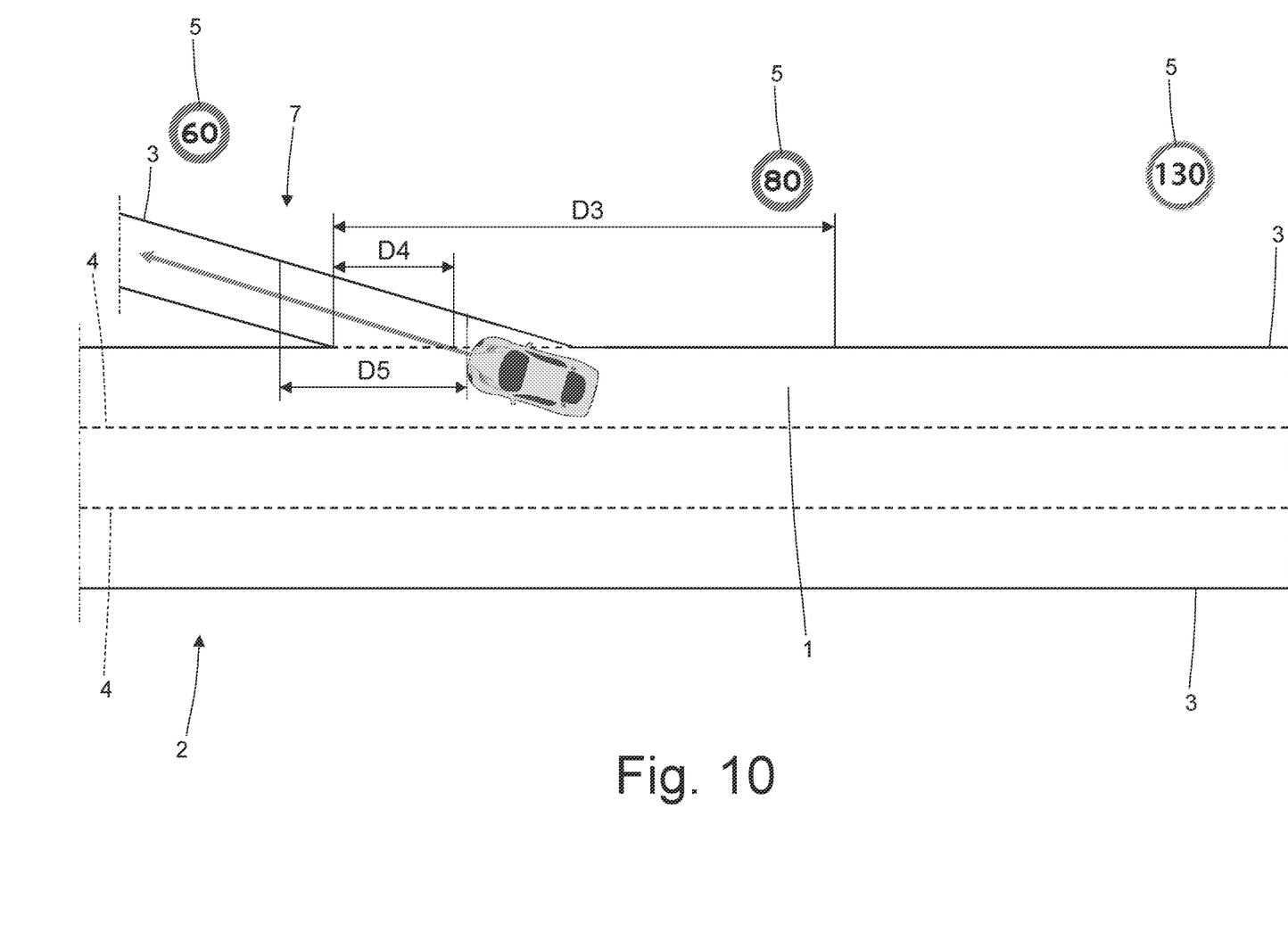

This condition is shown in FIG. 10, where the vehicle 1 changes lanes towards the detour 7 (alternatively it could have indicated the intention to change lanes towards the detour 7 by operating the corresponding direction indicator) and, at the same time, the road surface marking on the side of the vehicle 1 towards the detour 7 (i.e., the road surface marking delimiting the carriageway on the side of the vehicle 1 towards the detour 7) and ahead of the vehicle 1 is continuous and remains continuous throughout the predetermined distance D5; therefore, the vehicle 1 shown in FIG. 10 is established to be going to take the detour 7.

As already mentioned above, the vehicle 1 shown in FIG. 4 is outside the manoeuvring area A2 and does not change lanes and therefore the vehicle 1 shown in FIG. 4 is established to not be going to take the detour 7.

The vehicle 1 shown in FIG. 5 does not change lanes and therefore this vehicle 1 is established to not be going to take the detour 7.

Figure 6:
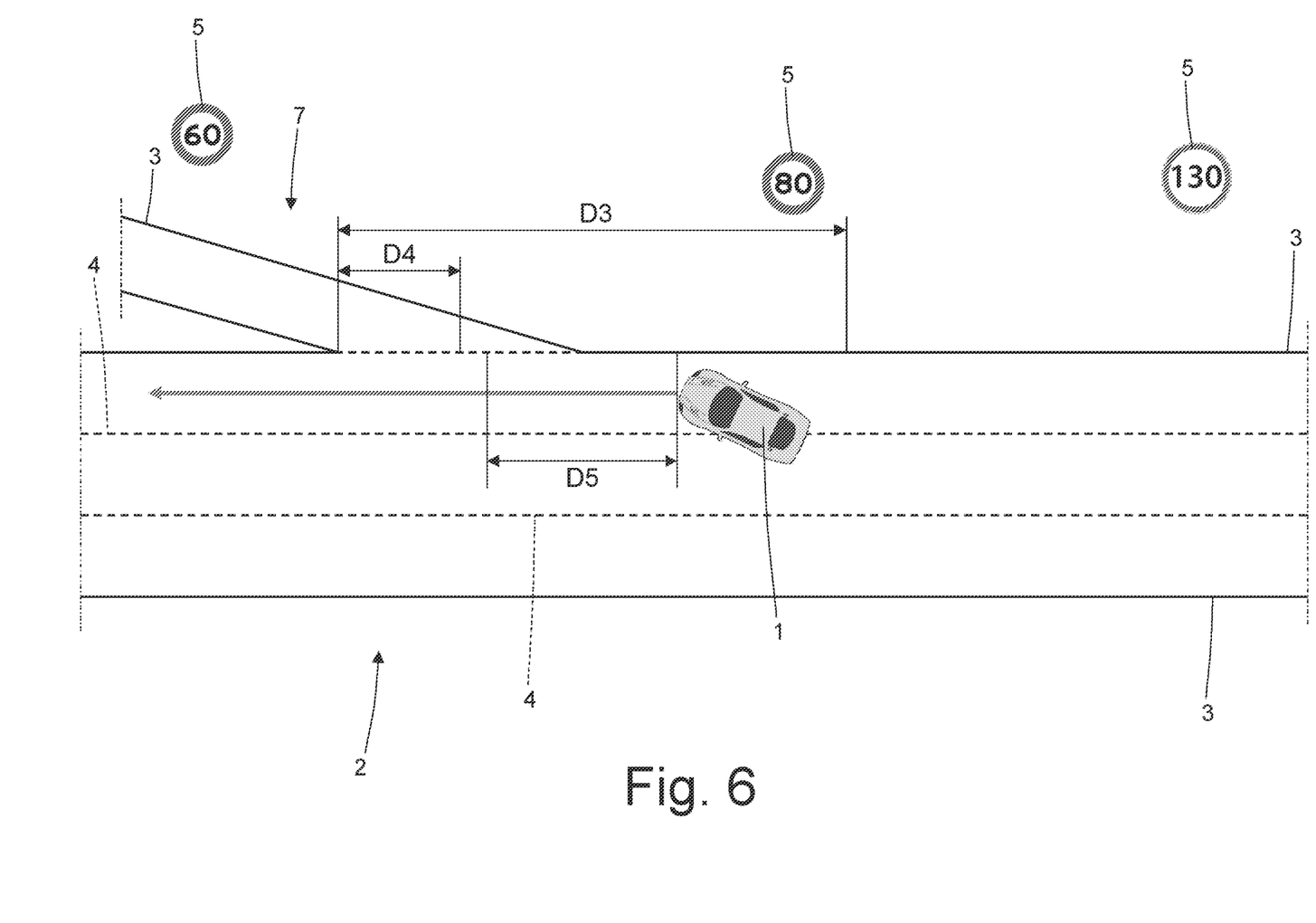

The vehicle 1 shown in FIG. 6 changes lanes towards the detour 7 but, at the same time, the road surface marking on the side of the vehicle 1 towards the detour 7 and ahead of the vehicle 1 does not remain continuous throughout the predetermined distance D5 (even if initially it is continuous for a short distance smaller than the predetermined distance D5), and therefore the vehicle 1 shown in FIG. 6 is established to not be going to take the detour 7.

Figure 7:
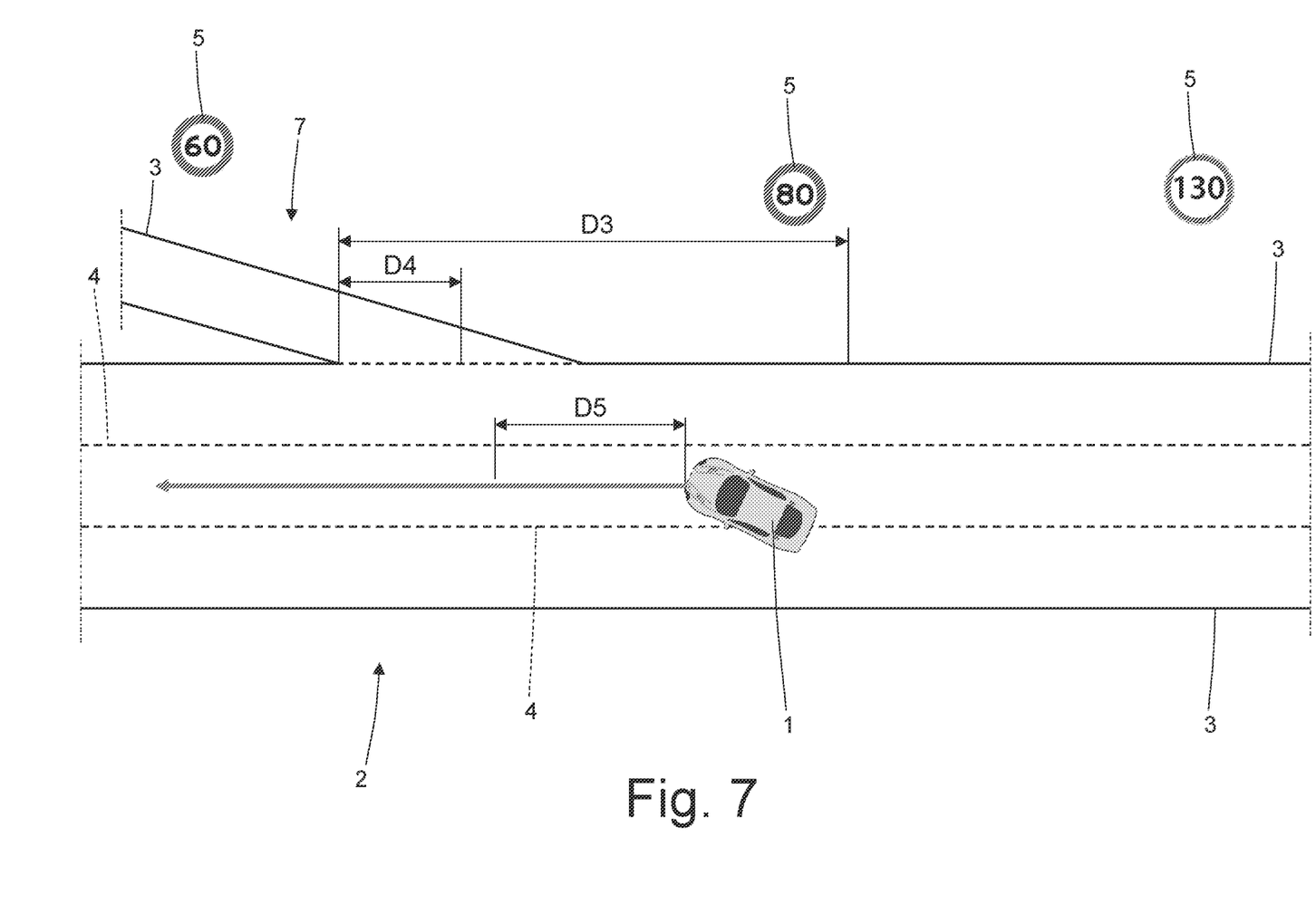
Figure 8:
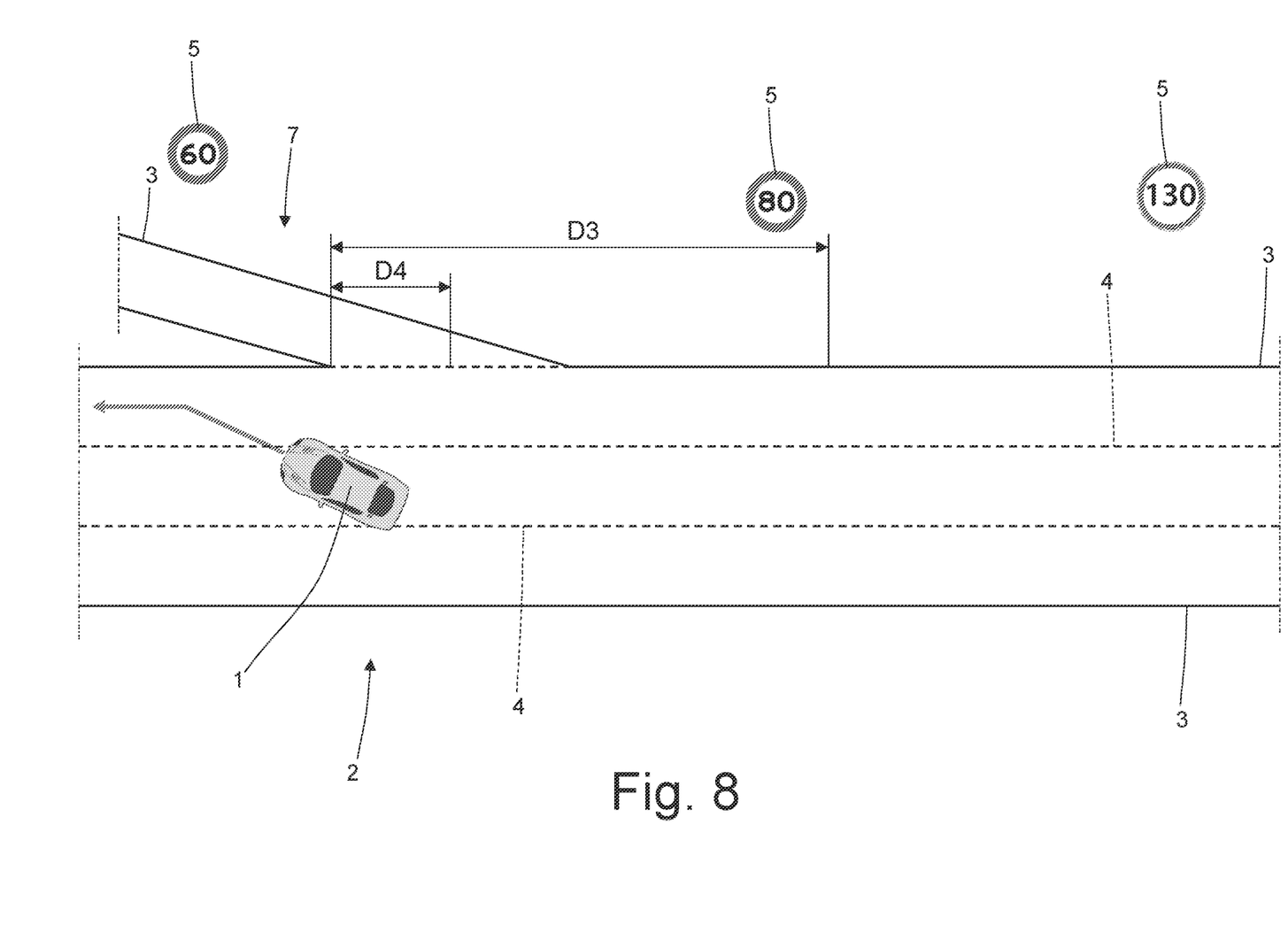

The vehicle 1 shown in FIG. 7 changes lanes towards the detour 7 but, at the same time, the road surface marking on the side of the vehicle 1 towards the detour 7 and ahead of the vehicle 1 is never continuous and therefore the vehicle 1 shown in FIG. 7 is established to not be going to take the detour 7.

As already mentioned above, the vehicle 1 shown in FIG. 8 changes lanes towards the detour 7 and, at the same time, the road surface marking on the side of the vehicle 1 towards the detour 7 and ahead of the vehicle 1 is continuous and remains continuous, but the vehicle 1 is outside the manoeuvring area A2 (it has already passed the detour 7), and therefore the vehicle 1 shown in FIG. 8 is established to not be going to take the detour 7.

Figure 9:
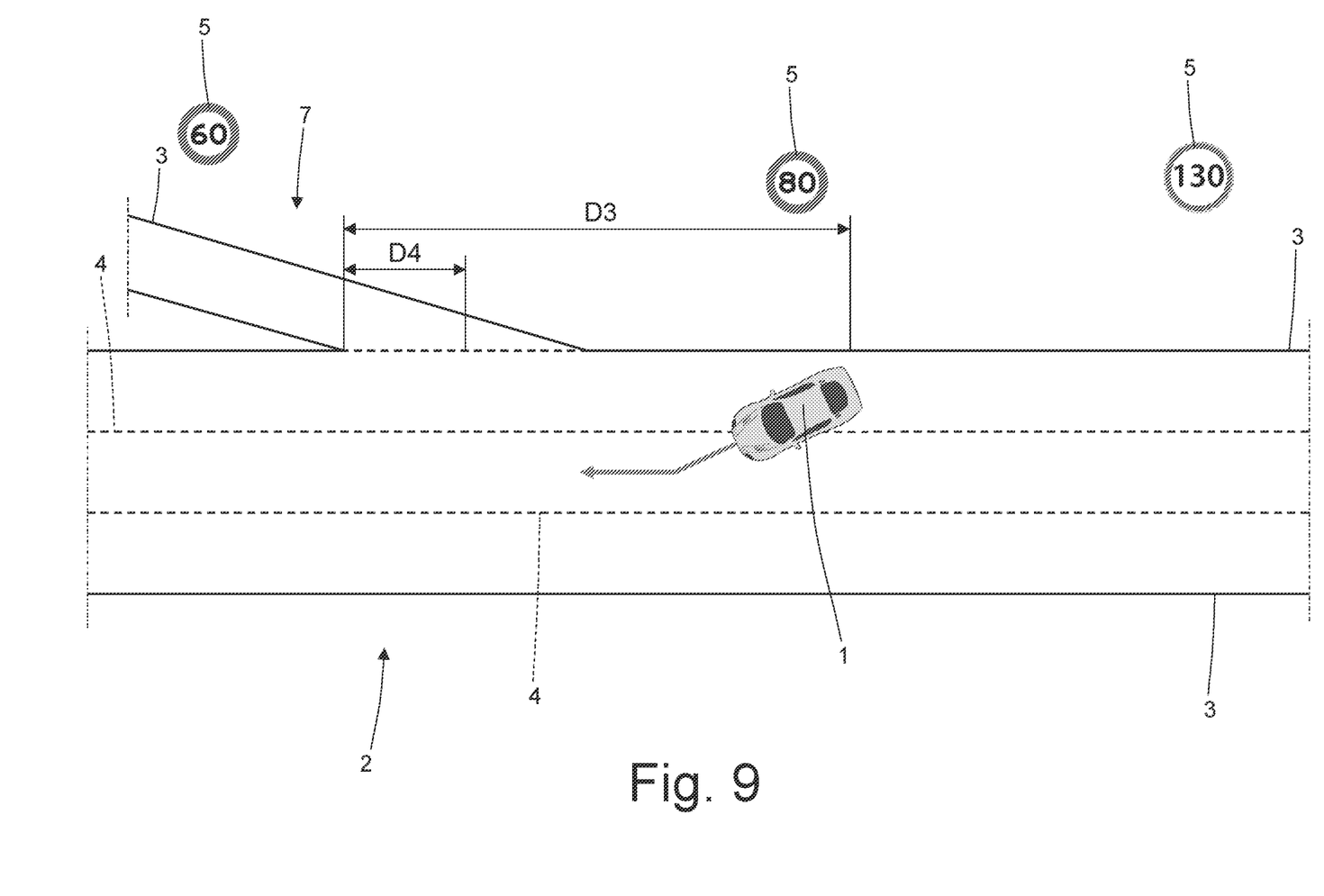

The vehicle 1 shown in FIG. 9 changes lanes but in the opposite direction to the detour 7 (i.e., not towards the detour 7) and therefore the vehicle 1 shown in FIG. 9 is established to not be going to take the detour 7.

In other words, the control method implemented in the automatic traffic sign recognition system 6 establishes that the driver is going to take the detour 7 only if the vehicle 1 changes lanes towards the detour 7 (alternatively, it could have indicated the intention to change lanes towards the detour 7 by operating the corresponding direction indicator) and, at the end of the lane change, a road surface marking delimiting the carriageway on the side of the vehicle 1 towards the detour 7 and ahead of the vehicle 1 is continuous and remains continuous (at least over the predetermined distance D5).

The control method implemented in the automatic traffic sign recognition system 6 establishes that the vehicle 1 changes lanes only when the vehicle 1 crosses a broken line of the road surface marking completely.

According to a preferred embodiment, the distances D1-D4 all refer to the final vertex of the detour 7, i.e., the corner of the detour 7 that is downstream in relation to the direction of travel; in other words, moving in the direction of travel, the detour 7 has an initial vertex (corner) and then a final vertex (corner) (to which the distances D1-D4 are referred).

According to a possible embodiment, the predetermined distances D1-D5 are always fixed (i.e., they do not change when the type of motion of the vehicle 1 is changed). According to a different embodiment, the predetermined distances D1-D5 change according to the forward speed of the vehicle 1, i.e., they increase (decrease) as the forward speed of the vehicle 1 increases (decreases). According to a different embodiment, the predetermined distances D1-D5 change according to the type of road the vehicle 1 is travelling on; for example, the distances D1-D5 are greater when the vehicle 1 is travelling on a motorway and smaller when the vehicle 1 is travelling on an expressway or A-road. According to a possible embodiment, the predetermined distances D1-D5 also change from state to state to adapt the predetermined distances D1-D5 to the peculiarities of the road signs of each state.

According to a preferred embodiment, the control method implemented in the automatic traffic sign recognition system 6 establishes that the driver is going to take a detour 7 only if, on the basis of information provided by the satellite positioning system equipped with georeferenced mapping, the main road 2 is a single-carriageway urban or suburban road, a multi-carriageway suburban road, or a motorway.

According to a preferred embodiment, the control method implemented in the automatic traffic sign recognition system 6 establishes that the driver is going to take a detour 7 only if, on the basis of information provided by the satellite positioning system equipped with georeferenced mapping, the detour 7 is an entrance/exit to/from a parking area, an entrance/exit to/from a service station, a ramp, the beginning of a service road, or the beginning of a parallel road; consequently, the control method implemented in the automatic traffic sign recognition system 6 does not establish that the driver is going to take a detour 7 when travelling through a roundabout.

As mentioned above, the control method implemented in the automatic traffic sign recognition system 6 must establish whether a speed limit set by the road sign next to the detour 7 refers to the detour 7 (i.e., establishes a speed limit applying to the detour 7 or establishes a speed limit applying to the main road 2).

According to a preferred embodiment, the control method implemented in the automatic traffic sign recognition system 6 determines, through the satellite positioning device equipped with georeferenced mapping, whether the vehicle 1 is travelling along a main road 2 having a plurality of detours 7 and therefore establishes that a speed limit set by a road sign refers to a detour 7 that is located ahead of the vehicle 1 only if the vehicle 1 is travelling along a main road 2. In other words, the control method implemented in the automatic traffic sign recognition system 6 establishes that the speed limit set by a road sign 5 refers to a detour 7 which is located ahead of the vehicle 1 only if, on the basis of information provided by the satellite positioning system equipped with georeferenced mapping, the main road 2 is a single-carriageway urban or suburban road, a multi-carriageway suburban road, or a motorway.

Furthermore, the control method implemented in the automatic traffic sign recognition system 6 establishes that the speed limit set by a road sign 5 refers to a detour 7 which is located ahead of the vehicle 1 only if, on the basis of information provided by the satellite positioning system equipped with georeferenced mapping, the detour 7 is an entrance/exit to/from a parking area, an entrance/exit to/from a service station, a ramp, the beginning of a service road, or the beginning of a parallel road; consequently, the control method implemented in the automatic traffic sign recognition system 6 does not establish that the speed limit set by a road sign 5 refers to a detour 7 when travelling through a roundabout.

According to a preferred embodiment, the control method implemented in the automatic traffic sign recognition system 6 determines, through the satellite positioning system equipped with georeferenced mapping, whether a road sign 5 is close to a detour 7 (i.e., is inside the area A1 pertaining to the detour which begins at the predetermined distance D1 upstream of the detour 7 and ends at the predetermined distance D2 downstream of the detour 7) and establishes that a speed limit set by the road sign 5 refers to the detour 7 only if the sign 5 is close to the detour 7 (i.e., if the sign 5 is inside the area A1 pertaining to the detour).

According to a preferred embodiment, the control method implemented in the automatic traffic sign recognition system 6 establishes that a speed limit set by a road sign 5 refers to a detour 7 which is located ahead of the vehicle 1 only if it is below a predetermined threshold value (e.g., 60-80 km/h) since a detour 7 always has a significantly reduced speed limit compared to the speed limit of the main road 2 (e.g., a speed limit of 130 km/h can never refer to a detour 7).

According to a preferred embodiment, the control method implemented in the automatic traffic sign recognition system 6 establishes that a speed limit set by a road sign refers to a detour 7 only if it is lower than a speed limit set by a previous road sign (a detour 7 must always be travelled at a lower speed compared to the main road 2).

According to a preferred embodiment, the control method implemented in the automatic traffic sign recognition system 6 establishes that a speed limit set by a road sign 5 refers to a detour 7 which is located ahead of the vehicle 1 only if (e.g., on the basis of information provided by the satellite positioning system equipped with georeferenced mapping) the sign 5 is only arranged on the same side of the main road 2 as the detour 7 (i.e., both the sign 5 and the detour 7 are on the same side of the main road 2) since the road signs arranged on both sides of the main road 2 or arranged on the opposite side of the main road 2 in relation to the detour 7 never refer to the detour 7.

According to a preferred embodiment, the control method implemented in the automatic traffic sign recognition system 6 detects whether work in progress is present ahead of the (typically by recognizing another road sign 5 vehicle 1 indicating the presence of work in progress) and establishes that a speed limit set by a road sign 5 refers to a detour 7 which is located ahead of the vehicle 1 only if there is no work in progress (i.e., in the case of work in progress ahead of the vehicle 1, the road sign 5 is always recognized as referring to the work in progress ahead of the vehicle 1 and thus assigned to the main road 2).

According to a preferred embodiment, the control method implemented in the automatic traffic sign recognition system 6 establishes that the speed limit set by the road sign 5 refers to a detour 7 which is located ahead of the vehicle 1 only if, on the basis of information provided by the satellite positioning system equipped with georeferenced mapping, the main road 2 does not change its typology at the sign 5 or at the detour 7.

To summarize the above, the control method implemented in the automatic traffic sign recognition system 6 warns the driver of a speed limit set by a road sign 5 and not related to a detour 7 for as long as (only if) the driver does not intend to take (takes) the detour 7. In other words, once it has been established whether a speed limit set by a road sign 5 is related to a detour 7 or to the main road 2, the driver is warned of a speed limit set by a road sign and not related to the detour 7 for as long as (only if) the driver does not intend to take the detour 7 and the driver is warned of a speed limit set by a road sign and related to the detour 7 when (only if) the driver intends to take (takes) the detour 7.

The embodiments described herein may be combined with each other without departing from the scope of protection of this invention.

The control method described above has many advantages.

Firstly, the control method described above prevents the driver from being warned of speed limits applying to a detour 7 when the driver is not actually going to take the detour 7 but is going to continue along the main road 2 and, similarly, prevents the driver from being warned of speed limits applying to the main road 2 when the driver is going to take the detour 7. In particular, the control method described above is particularly effective (i.e., it has a very low percentage of false negatives, or failures to recognize the intention to take a detour 7) and is also particularly efficient (i.e., it has a very low percentage of false positives, or incorrect recognition of the intention to take a detour (7)).

In addition, the control method described above can be implemented in an automatic traffic sign recognition system 6 with simple software updates requiring neither additional hardware nor high computing power or a large memory footprint.

LIST OF REFERENCE NUMBERS OF THE FIGURES 1 vehicle
2 main road
3 external lines
4 internal lines
5 road signs
6 automatic traffic sign recognition system
7 detour
D1 distance
D2 distance
D3 distance
D5 distance
A1 pertaining area
A2 manoeuvring area

The invention claimed is:

1. A control method to control a vehicle (1) driving along a main road (2) having a plurality of detours (7); the control method comprises the steps of:
  recognising a road surface marking present on a surface of the main road (2);
  recognising a road sign present beside the main road (2) in order to determine possible speed limits set by the road sign;
  warning a driver of the vehicle (1) of at least part of the speed limits set by the road sign;
  establishing whether a speed limit set by a road sign (5) refers to the main road (2) or to a detour (7) which is located ahead of the vehicle (1);
  checking, through the information provided by a satellite positioning system equipped with georeferenced mapping, whether the road sign (5) is located in an area (A1) pertaining to the detour (7);
  checking whether the speed limit set by the road sign (5) is lower than a speed limit currently signalled by a previous road sign to the driver of the vehicle (1);
  establishing that the speed limit set by the road sign (5) refers to the main road (2) if the road sign (5) is outside the area (A1) pertaining to the detour (7) or if the speed limit set by the road sign (5) is higher than or equal to the speed limit currently signalled by the previous road sign to the driver of the vehicle (1); and
  establishing that the speed limit set by the road sign (5) refers to the detour (7) only if the road sign (5) is inside the area (A1) pertaining to the detour (7) and, at the same time, only if the speed limit set by the road sign (5) is lower than the speed limit currently signalled by a prior road sign to the driver of the vehicle (1),
  wherein the area (A1) pertaining to the detour (7) begins upstream of the detour (7) and at a first predetermined distance (D1) from the detour (7);
  wherein the area (A1) pertaining to the detour (7) ends downstream of the detour (7) and at a second predetermined distance (D2) from the detour (7), smaller than the first predetermined distance (D1).

2. The control method according to claim 1 and comprising the further steps of:
  establishing whether the driver is going to take the detour (7);
  warning the driver of a speed limit set by the road sign (5) and related to the main road (2) for as long as the driver does not intend to take the detour (7); and
  warning the driver of a speed limit set by the road sign (5) and related to the detour (7) when the driver is going to take the detour (7).

3. The control method according to claim 1, wherein an extent of the area (A1) pertaining to the detour (7) is determined solely on the basis of information provided by the satellite positioning system equipped with georeferenced mapping.

4. The control method according to claim 1, wherein the first predetermined distance (D1) ranges from 80 to 140 metres and the second predetermined distance (D2) ranges from 20 to 40 metres.

5. The control method according to claim 1, wherein the speed limit set by the road sign (5) is established to be related to the detour (7) which is located ahead of the vehicle (1) only if it is below a predetermined threshold value.

6. The control method according to claim 1, wherein the speed limit set by the road sign (5) is established to be related to the detour (7) which is located ahead of the vehicle (1) only if, on the basis of information provided by the satellite positioning system equipped with georeferenced mapping, the road sign (5) is only arranged on the same side of the main road (2) as the detour (7).

7. The control method according to claim 1 and comprising the further steps of:
  determining whether work in progress is present ahead of the vehicle (1); and
  establishing that a speed limit set by the road sign (5) refers to the detour (7) ahead of the vehicle (1) only if no work in progress is present ahead of the vehicle (1).

8. The control method according to claim 1, wherein the speed limit set by the road sign (5) is established to be related to the detour (7) which is located ahead of the vehicle (1) only if, on the basis of information provided by the satellite positioning system equipped with georeferenced mapping, the main road (2) is a single-carriageway urban or suburban road, a multi-carriageway suburban road, or a motorway.

9. The control method according to claim 1, wherein the speed limit set by the road sign (5) is established to be related to the detour (7) which is located ahead of the vehicle (1) only if, on the basis of information provided by the satellite positioning system equipped with georeferenced mapping, the detour (7) is an entrance/exit to/from a parking area, an entrance/exit to/from a service station, a ramp, the beginning of a service road, or the beginning of a parallel road.

10. The control method according to claim 1, wherein the speed limit set by the road sign (5) is established to be related to the detour (7) which is located ahead of the vehicle (1) only if, on the basis of information provided by the satellite positioning system equipped with georeferenced mapping, the main road (2) does not change its typology at the road sign (5) or at the detour (7).

11. The control method according to claim 1 and comprising the further steps of:
  establishing that the driver is going to take the detour (7) only if, when a position of the vehicle (1) provided by the satellite positioning system equipped with georeferenced mapping is within a manoeuvring area (A2) of the detour (7), the vehicle (1) operates a direction indicator towards the detour (7) or changes lanes towards the detour (7) and, at the same time, only if a line of the road surface marking delimiting a carriageway on the side of the vehicle (1) towards the detour (7) and ahead of the vehicle (1) is continuous;

warning the driver of the speed limit set by the road sign (5) and related to the main road (2) for as long as the driver does not intend to take the detour (7); and warning the driver of the speed limit set by the road sign (5) and related to the detour (7) only when the driver is going to take the detour (7).

12. The control method according to claim 11, wherein the manoeuvring area (A2) of the detour (7) begins upstream of the detour (7) and at a third predetermined distance (D3) from the detour (7) and ends upstream of the detour (7) and at a second predetermined distance (D4) from the detour (7), smaller than the first predetermined distance (D3).

13. The control method according to claim 11, wherein the driver is established to be going to take the detour (7) only if the line of the road surface marking delimiting the carriageway on the side of the vehicle (1) towards the detour (7) and ahead of the vehicle (1) is continuous and constantly remains continuous over a fifth predetermined distance (D5).

14. A control method to control a vehicle (1) driving along a main road (2) having a plurality of detours (7); the control method comprises the steps of:

recognising a road surface marking present on a surface of the main road (2);

recognising a road sign present beside the main road (2) in order to determine possible speed limits set by the road sign;

warning a driver of the vehicle (1) of at least part of the speed limits set by the road sign;

establishing whether a speed limit set by a road sign (5) refers to the main road (2) or to a detour (7) which is located ahead of the vehicle (1);

checking, through the information provided by a satellite positioning system equipped with georeferenced mapping, whether the road sign (5) is located in an area (A1) pertaining to the detour (7);

checking whether the speed limit set by the road sign (5) is lower than a speed limit currently signalled to the driver of the vehicle (1);

establishing that the speed limit set by the road sign (5) refers to the main road (2) if the road sign (5) is outside the area (A1) pertaining to the detour (7) or if the speed limit set by the road sign (5) is higher than or equal to the speed limit currently signalled to the driver of the vehicle (1);

establishing that the speed limit set by the road sign (5) refers to the detour (7) only if the road sign (5) is inside the area (A1) pertaining to the detour (7) and, at the same time, only if the speed limit set by the road sign (5) is lower than the speed limit currently signalled to the driver of the vehicle (1);

determining whether work in progress is present ahead of the vehicle (1); and establishing that a speed limit set by the road sign (5) refers to the detour (7) ahead of the vehicle (1) only if no work in progress is present ahead of the vehicle (1).

15. A control method to control a vehicle (1) driving along a main road (2) having a plurality of detours (7); the control method comprises the steps of:

recognising a road surface marking present on a surface of the main road (2);

recognising a road sign present beside the main road (2) in order to determine possible speed limits set by the road sign;

warning a driver of the vehicle (1) of at least part of the speed limits set by the road sign;

establishing whether a speed limit set by a road sign (5) refers to the main road (2) or to a detour (7) which is located ahead of the vehicle (1);

checking, through the information provided by a satellite positioning system equipped with georeferenced mapping, whether the road sign (5) is located in an area (A1) pertaining to the detour (7);

checking whether the speed limit set by the road sign (5) is lower than a speed limit currently signalled to the driver of the vehicle (1);

establishing that the speed limit set by the road sign (5) refers to the main road (2) if the road sign (5) is outside the area (A1) pertaining to the detour (7) or if the speed limit set by the road sign (5) is higher than or equal to the speed limit currently signalled to the driver of the vehicle (1); and establishing that the speed limit set by the road sign (5) refers to the detour (7) only if the road sign (5) is inside the area (A1) pertaining to the detour (7) and, at the same time, only if the speed limit set by the road sign (5) is lower than the speed limit currently signalled to the driver of the vehicle (1);

wherein the speed limit set by the road sign (5) is established to be related to the detour (7) which is located ahead of the vehicle (1) only if, on the basis of information provided by the satellite positioning system equipped with georeferenced mapping, the main road (2) does not change its typology at the road sign (5) or at the detour (7).

16. A control method to control a vehicle (1) driving along a main road (2) having a plurality of detours (7); the control method comprises the steps of:

recognising a road surface marking present on a surface of the main road (2);

recognising a road sign present beside the main road (2) in order to determine possible speed limits set by the road sign;

warning a driver of the vehicle (1) of at least part of the speed limits set by the road sign;

establishing whether a speed limit set by a road sign (5) refers to the main road (2) or to a detour (7) which is located ahead of the vehicle (1);

checking, through the information provided by a satellite positioning system equipped with georeferenced mapping, whether the road sign (5) is located in an area (A1) pertaining to the detour (7);

checking whether the speed limit set by the road sign (5) is lower than a speed limit currently signalled to the driver of the vehicle (1);

establishing that the speed limit set by the road sign (5) refers to the main road (2) if the road sign (5) is outside the area (A1) pertaining to the detour (7) or if the speed limit set by the road sign (5) is higher than or equal to the speed limit currently signalled to the driver of the vehicle (1);

establishing that the speed limit set by the road sign (5) refers to the detour (7) only if the road sign (5) is inside the area (A1) pertaining to the detour (7) and, at the same time, only if the speed limit set by the road sign (5) is lower than the speed limit currently signalled to the driver of the vehicle (1);

establishing that the driver is going to take the detour (7) only if, when a position of the vehicle (1) provided by the satellite positioning system equipped with georeferenced mapping is within a manoeuvring area (A2) of the detour (7), the vehicle (1) operates a direction indicator towards the detour (7) or changes lanes towards the detour (7) and, at the same time, only if a line of the road surface marking delimiting a carriageway on the side of the vehicle (1) towards the detour (7) and ahead of the vehicle (1) is continuous;

warning the driver of the speed limit set by the road sign (5) and related to the main road (2) for as long as the driver does not intend to take the detour (7); and warning the driver of the speed limit set by the road sign (5) and related to the detour (7) only when the driver is going to take the detour (7), wherein the manoeuvring area (A2) of the detour (7) begins upstream of the detour (7) and at a third predetermined distance (D3) from the detour (7) and ends upstream of the detour (7) and at a second predetermined distance (D4) from the detour (7), smaller than the first predetermined distance (D3).

17. The control method according to claim 16, wherein the driver is established to be going to take the detour (7) only if the line of the road surface marking delimiting the carriageway on the side of the vehicle (1) towards the detour (7) and ahead of the vehicle (1) is continuous and constantly remains continuous over a third predetermined distance (D3).

18. A control method to control a vehicle (1) driving along a main road (2) having a plurality of detours (7); the control method comprises the steps of:

recognising a road surface marking present on a surface of the main road (2);

recognising a road sign present beside the main road (2) in order to determine possible speed limits set by the road sign;

warning a driver of the vehicle (1) of at least part of the speed limits set by the road sign;

establishing whether a speed limit set by a road sign (5) refers to the main road (2) or to a detour (7) which is located ahead of the vehicle (1);

checking, through the information provided by a satellite positioning system equipped with georeferenced mapping, whether the road sign (5) is located in an area (A1) pertaining to the detour (7);

checking whether the speed limit set by the road sign (5) is lower than a speed limit currently signalled to the driver of the vehicle (1);

establishing that the speed limit set by the road sign (5) refers to the main road (2) if the road sign (5) is outside the area (A1) pertaining to the detour (7) or if the speed limit set by the road sign (5) is higher than or equal to the speed limit currently signalled to the driver of the vehicle (1);

establishing that the speed limit set by the road sign (5) refers to the detour (7) only if the road sign (5) is inside the area (A1) pertaining to the detour (7) and, at the same time, only if the speed limit set by the road sign (5) is lower than the speed limit currently signalled to the driver of the vehicle (1);

establishing that the driver is going to take the detour (7) only if, when a position of the vehicle (1) provided by the satellite positioning system equipped with georeferenced mapping is within a manoeuvring area (A2) of the detour (7), the vehicle (1) operates a direction indicator towards the detour (7) or changes lanes towards the detour (7) and, at the same time, only if a line of the road surface marking delimiting a carriageway on the side of the vehicle (1) towards the detour (7) and ahead of the vehicle (1) is continuous;

warning the driver of the speed limit set by the road sign (5) and related to the main road (2) for as long as the driver does not intend to take the detour (7); and warning the driver of the speed limit set by the road sign (5) and related to the detour (7) only when the driver is going to take the detour (7);

wherein the driver is established to be going to take the detour (7) only if the line of the road surface marking delimiting the carriageway on the side of the vehicle (1) towards the detour (7) and ahead of the vehicle (1) is continuous and constantly remains continuous over a predetermined distance (D5).

* * * * *